Patented Apr. 25, 1950

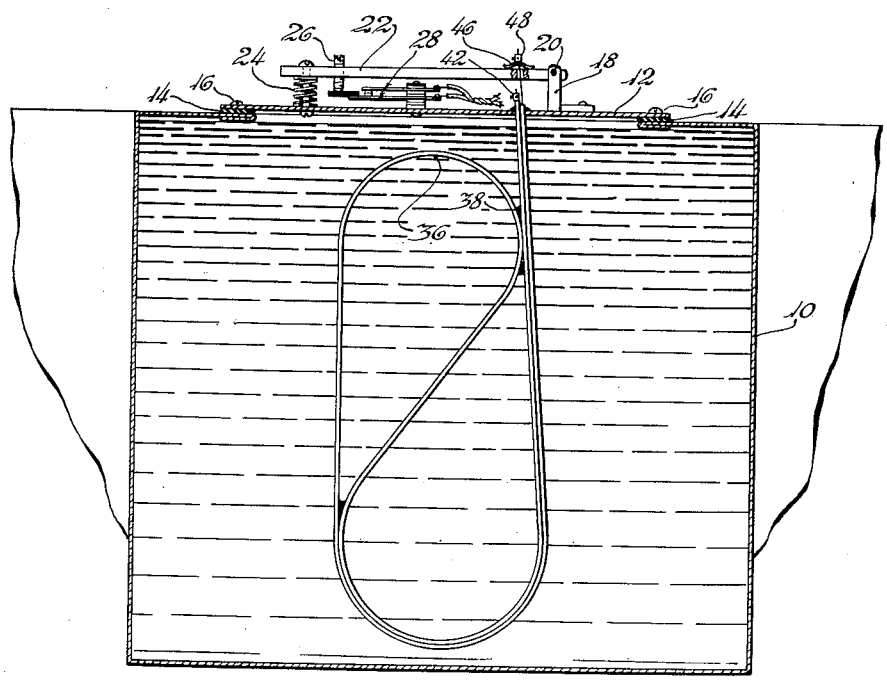
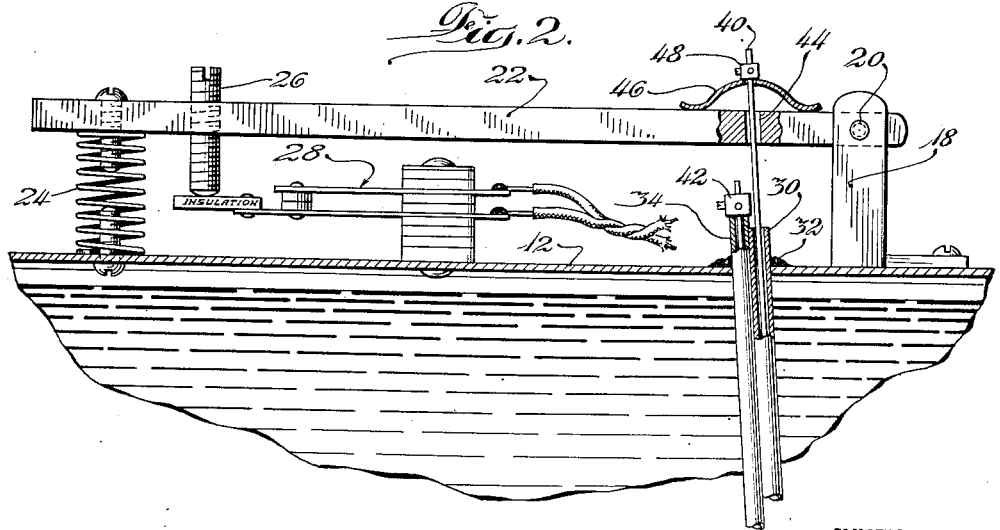

2,505,599

UNITED STATES PATENT OFFICE 2,505,599

THERMOSTAT

Lynn A. Williams, Jr., Indianapolis, Ind., assignor to Stewart-Warner Corporation, Chicago, Ill., a corporation of Virginia Application April 30, 1947, Serial No. 744,908

1 Claim. (Cl. 297—14)

The present invention relates to thermostats and more particularly to thermostats of the type which are actuated by the dissimilarity in the rate of expansion of different metals. One of the object of the present invention is to provide a novel low cost thermostat which is accurate and which responds almost instantaneously to changes in temperature.

A further object is to provide an improved thermostat of the above type which is particularly adaptable for use in liquid vessels while at the same time permitting the switch or other element which is actuated by the thermostat to be located outside of the vessel without the necessiy for providing any liquid seals in the vessel wall.

Still another object is to provide an improved thermostat which accomplishes the above, which develops considerable force and produces considerable motion without being heavy, complicated or expensive.

Other objects and advantages will become apparent from the following description of a preferred embodiment of my invention.

In the drawings, in which similar characters of reference refer to similar parts throughout the several views, I have illustrated a device embodying one form of the invention.

Fig. 1 of the drawings is a somewhat diagrammatic representation of a thermostat embodying the present invention shown from the side and disposed within a liquid receptacle; and Fig. 2 is similar to the upper portion of Fig. 1 excepting that it is drawn to larger scale so as to indicate more clearly details of the invention.

In Fig. 1 of the drawings I have shown a tank or receptacle 10 which may be considered as a portion of a hot water heater or other receptacle containing water or other liquids to which the thermostat is to be responsive. As an example, this tank may be equipped with a cover 12 secured in place against a gasket 14 by screws 16. An L-shaped bracket 18 is secured to the upper surface of the cover 12 and is pivoted at 20 to a horizontal beam or bar 22, the opposite or free end of which is urged outwardly by a coil spring 24. This bar at a point near its free end is provided with an adjustment screw 26 which is threaded vertically therethrough and is so arranged that its lower end is adapted to operate an electric switch 28 or other element to be actuated whenever the free end of the bar has moved downwardly some predetermined amount.

The temperature responsive element of the thermostat comprises a length of capillary tubing 30 made of brass or some other metal having a high coefficient of thermal expansion. One end of this tube is disposed beneath the bar 22 at a point near the pivot 20 and extends through the cover 12, the cover and tube being sealed together and leakage being prevented by soldering the two together, the solder being indicated at 32. The tube 30 extends downwardly into the liquid receptacle for a considerable distance, the exact distance being determined largely by the shape and size of the receptacle. Within the liquid receptacle the tube is curled so as to form several convolutions and the opposite end, indicated at 34, is also brought out through the cover 12 and soldered rigidly in place so as to prevent leakage. If desired, the two ends of the tube may be placed adjacent each other as shown and may be secured together by soldering throughout a considerable portion of their length. In this event, both ends of the tube may be soldered to the cover by a single soldering operation or the remote end may be left free.

As shown, the two end portions of the tube lie in contact with each other and are soldered together for a considerable distance. The central portion of the tube, however, is curved to form a loop 36 of comparatively large radius and this loop is bent around and is soldered as at 38 to the standing portions of the tube slightly below the cover 12. This gives a comparatively rigid structure and is easy to fabricate. As will be apparent presently, the tube should be formed without causing sharp bends, but with this restriction in mind the tubing may be bent to almost any desired shape, depending largely upon the size and shape of the liquid vessel and upon the length of tubing it is desired to dispose within the liquid space.

A small diameter wire 40 of Invar or similar material which has a very low coefficient of thermal expansion extends from end to end through the capillary tubing 30 so that both ends of the wire project. A collar 42 is secured to one of these ends in any suitable manner and the other end of the wire is then pulled tight so as to draw the collar 42 against the end of the tube. The opposite or free end of the wire is then passed through an opening 44 in the bar 22 and through a leaf spring 46 and is fitted at its upper end with a second collar 48 of any suitable type which is secured tightly to the wire in contact with the upper surface of the spring 46.

Whenever the temperature of the water or other liquid in the receptacle 10 rises the tube 30 will expand whereas the wire 40 will expand a much less amount. Since the collar 42 cannot move with respect to the end of the tube with which it is in contact, the wire will be drawn downwardly into the opposite end of the tube and therefore will pull downwardly on the switch bar 22 so as to operate the switch 28 at some predetermined temperature. Upon a decrease in the temperature of the water the tube will contract, thereby permitting the end of the wire secured to the collar 48 to move upwardly under the influence of the spring 24 which raises the free end of the switch bar 22, thereby operating the electric switch in the opposite direction.

From the above description of a preferred embodiment of my invention it will be seen that a thermostat of this type may be manufactured at low cost and that no trouble with leakage at the soldered point 32 is likely to result. Further, substantially any degree of movement of the collar 48 with temperature change can be accomplished simply by increasing or decreasing the length of the tubing 30 and the wire which passes through this tubing. Because of the fact that the wire 40 is under tension at all times it may be of very small diameter since it need not be rigid as is true of the actuating element of some types of thermostats which maintain the low expansion element under compression.

Having described my invention, what I claim as new and useful and desire to secure by Letters Patent of the United States is:

A thermostatic element adapted to be sensitive to the temperature of a liquid mass confined by a wall comprising a length of coiled capillary tubing submerged in said liquid and formed of a metal having a high coefficient of thermal expansion, both ends of said tubing being brought out through said wall in liquid-tight relation thereto, a wire of a material having a low coefficient of thermal expansion extending through said tubing from end to end, both ends of said wire passing outwardly from the ends of said tubing, one end of said wire being fixed so that it cannot be retracted into said tubing, and movement responsive means connected between the other end of said tubing and the other end of said wire whereby temperature changes of said tubing and said wire will cause relative expansion between said wire and said tubing so that the free end of said wire will move relative to its end of the tubing, and biasing means for pulling upon the free end of said wire for keeping said wire tight in said tubing.

LYNN A. WILLIAMS, JR.

REFERENCES CITED

The following references are of record in the file of this patent:

UNITED STATES PATENTS

| Number | Name | Date |
| --- | --- | --- |
| 1,472,725 | McClure | Oct. 30, 1923 |
| 1,599,208 | Carpenter | Sept. 7, 1926 |
| 1,782,458 | Brennen | Nov. 25, 1930 |

FOREIGN PATENTS

| Number | Country | Date |
| --- | --- | --- |
| 517,012 | Great Britain | Jan. 17, 1940 |
| 600,471 | France | Nov. 9, 1925 |